March 3, 1959 D. GERDAN ET AL 2,875,579
GAS TURBINE ENGINE MIDFRAME
Filed Aug. 8, 1952 12 Sheets-Sheet 1

INVENTORS
Demitrius Gerdan &
BY Charles J. McDowall
Willits, Helmig & Baillio
ATTORNEYS INVENTORS
Dimitrius Gerdan &
BY Charles J. McDowall
Willits, Helwig & Baillie
ATTORNEYS INVENTORS
Dimitrius Gerdan &
BY Charles J. McDowall
Willits, Helwig & Baillio
ATTORNEYS March 3, 1959  D. GERDAN ET AL  2,875,579
GAS TURBINE ENGINE MIDFRAME
Filed Aug. 8, 1952  12 Sheets-Sheet 5

INVENTORS
Dimitrius Gerdan &
BY Charles J. McDowall
Willits Helwig Gaille
ATTORNEYS March 3, 1959

D. GERDAN ET AL 2,875,579

GAS TURBINE ENGINE MIDFRAME

Filed Aug. 8, 1952

INVENTORS
Dimitrius Gerdan &
BY Charles J. McDowell

Willita Helmig & Cailko
ATTORNEYS

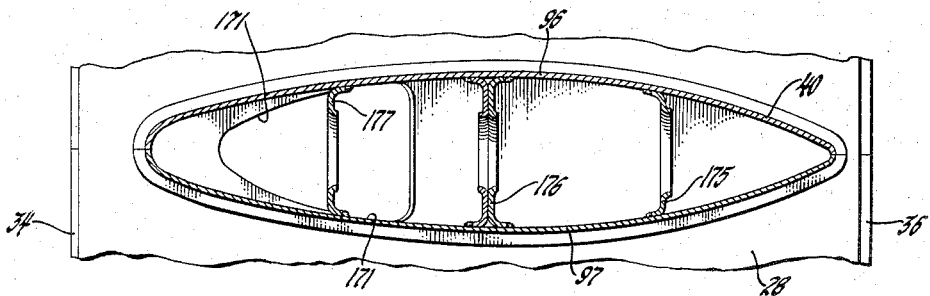
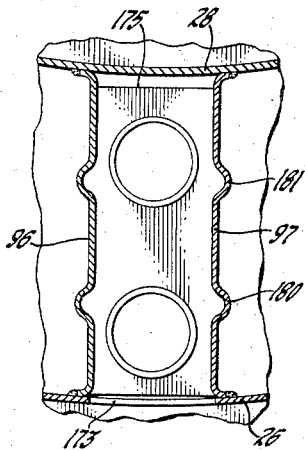
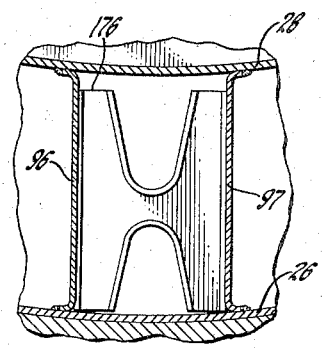
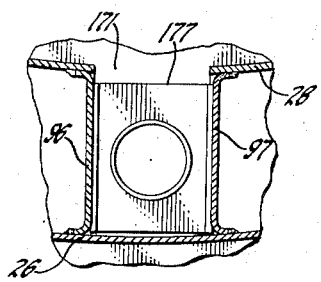

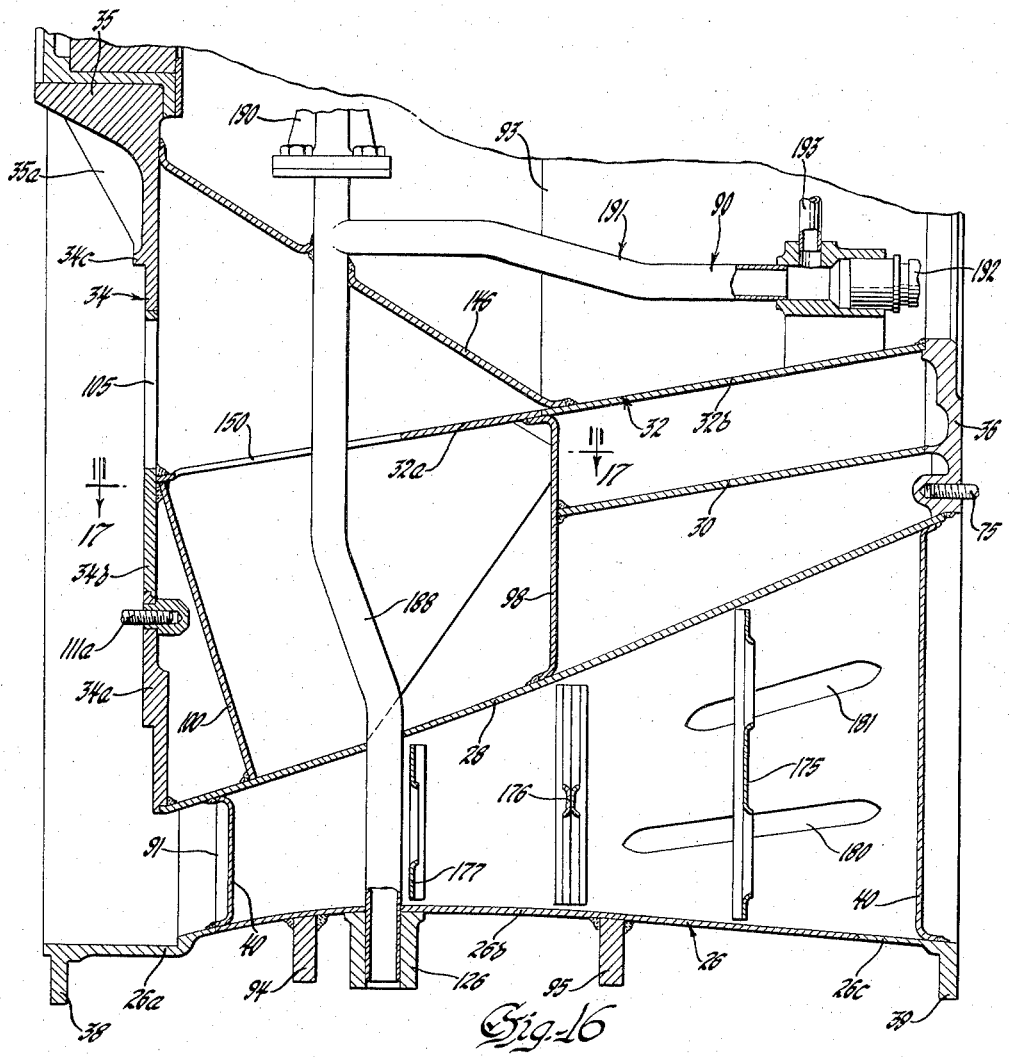

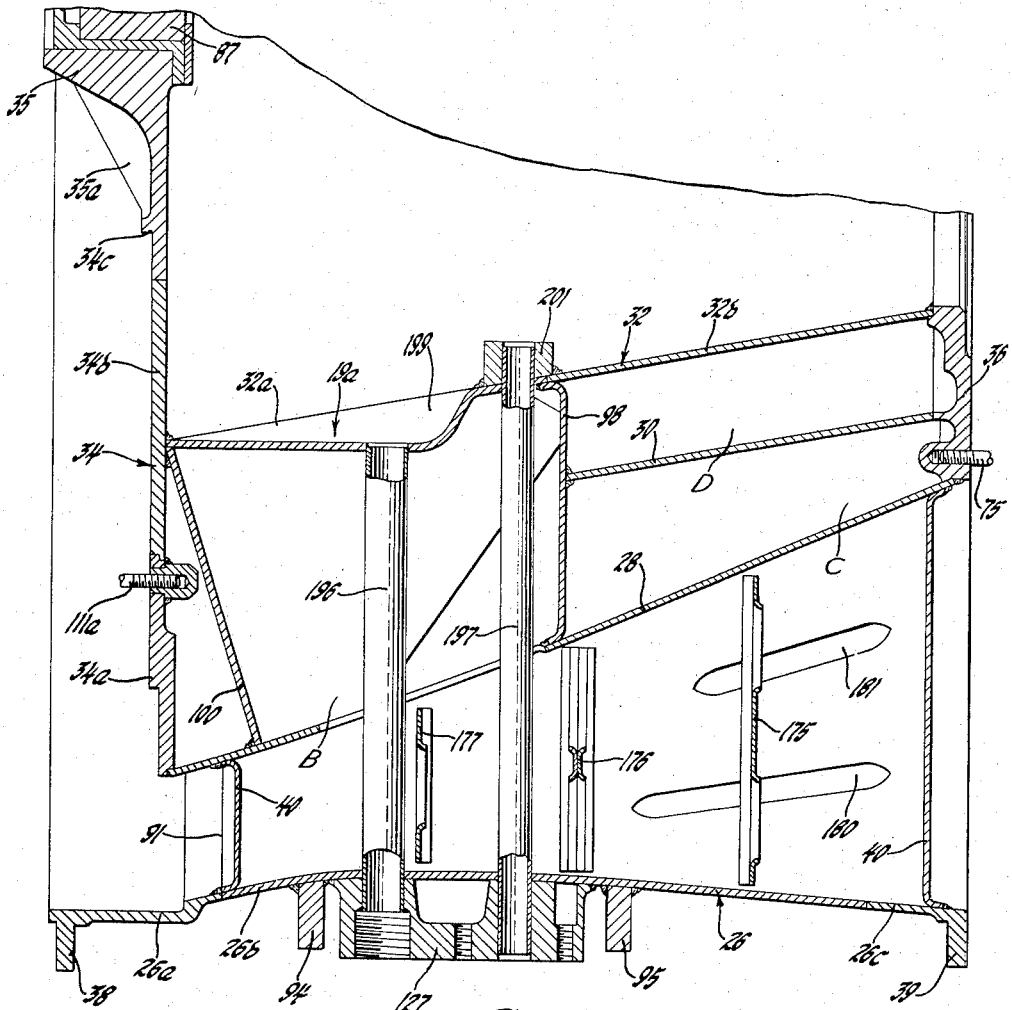

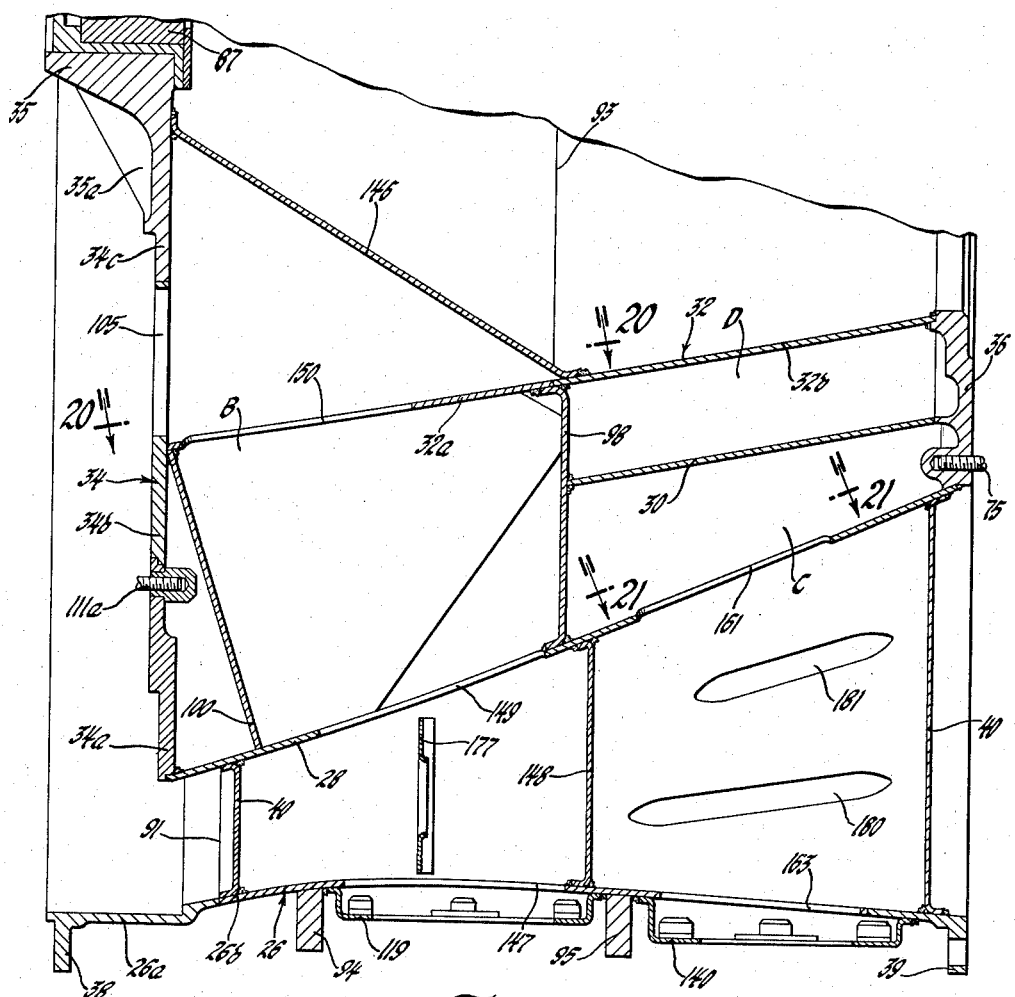
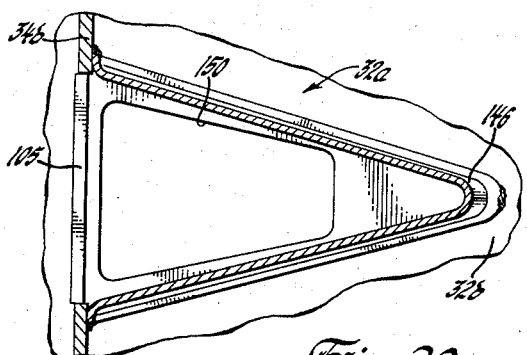
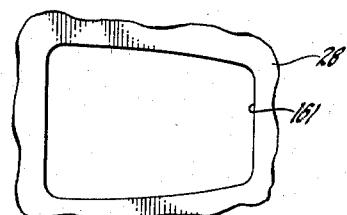

United States Patent Office 2,875,579
Patented Mar. 3, 1959

2,875,579

GAS TURBINE ENGINE MIDFRAME

Dimitrius Gerdan and Charles J. McDowall, Indianapolis, Ind., assignors to General Motors Corporation, Detroit, Mich., a corporation of Delaware Application August 8, 1952, Serial No. 303,252

21 Claims. (Cl. 60—39.31)

Our invention relates to gas turbine engines and, more particularly, to an improved construction for a midframe structure for a gas turbine aircraft engine.

One of the principal components of many axial flow gas turbine engines is the midframe, which is the main structural support member therefor. The midframe is an annular structure located between the discharge end of the compressor and the inlet to the combustion apparatus of the engine and defines an annular outlet or diffuser passage for conducting compressed air to the combusion apparatus.

Midframe structures which have been employed in the past have been of relatively simple internal configuration and of cast construction to ensure adequate strength and rigidity. However, with new and improved engine designs, it has become necessary to provide additional passages and chambers within the interior of the midframe for various purposes, thereby increasing its complexity and rendering its construction by casting processes particularly difficult from the standpoint of manufacturing expediency and heavy from the standpoint of weight considerations.

Accordingly, it is the general object of our invention to provide an improved construction for a gas turbine engine midframe that is extremely light in weight, which is of sufficient structural strength, rigidity and durability, and yet is relatively simple and easy to manufacture.

Another object is to provide a gas turbine engine midframe of lightweight unitary construction containing a number of passages, chambers and conduits, compactly embodied therein for conducting, admitting and discharging air to and from various parts of the engine.

Another object is to provide a gas turbine midframe of lightweight unitary construction containing a number of passages, chambers and conduits compactly embodied therein for conducting, admitting and discharging air to and from various parts of the engine.

Another object is to provide a gas turbine midframe of lightweight unitary construction containing a number of passages, chambers and conduits forming parts of different air circuits for conducting, admitting or discharging high and low pressure air through the midframe to and from different parts of the engine without interfering with the flow of air in any particular air passage therein.

Still another object is to provide a fabricated midframe structure consisting substantially entirely of a welded sheet metal assembly.

The above and other objects of our invention, together with the attending features and advantages thereof, will appear more fully from the following detailed description and drawings, wherein:

Fig. 1 is a longitudinal sectional view of a portion of a gas turbine engine which embodies a midframe in accordance with the present invention;

Figs. 2 and 3 are views of the forward and after ends of the midframe of Fig. 1 taken in the planes 2—2 and 3—3, respectively, indicated in Fig. 1;

Figure 2:
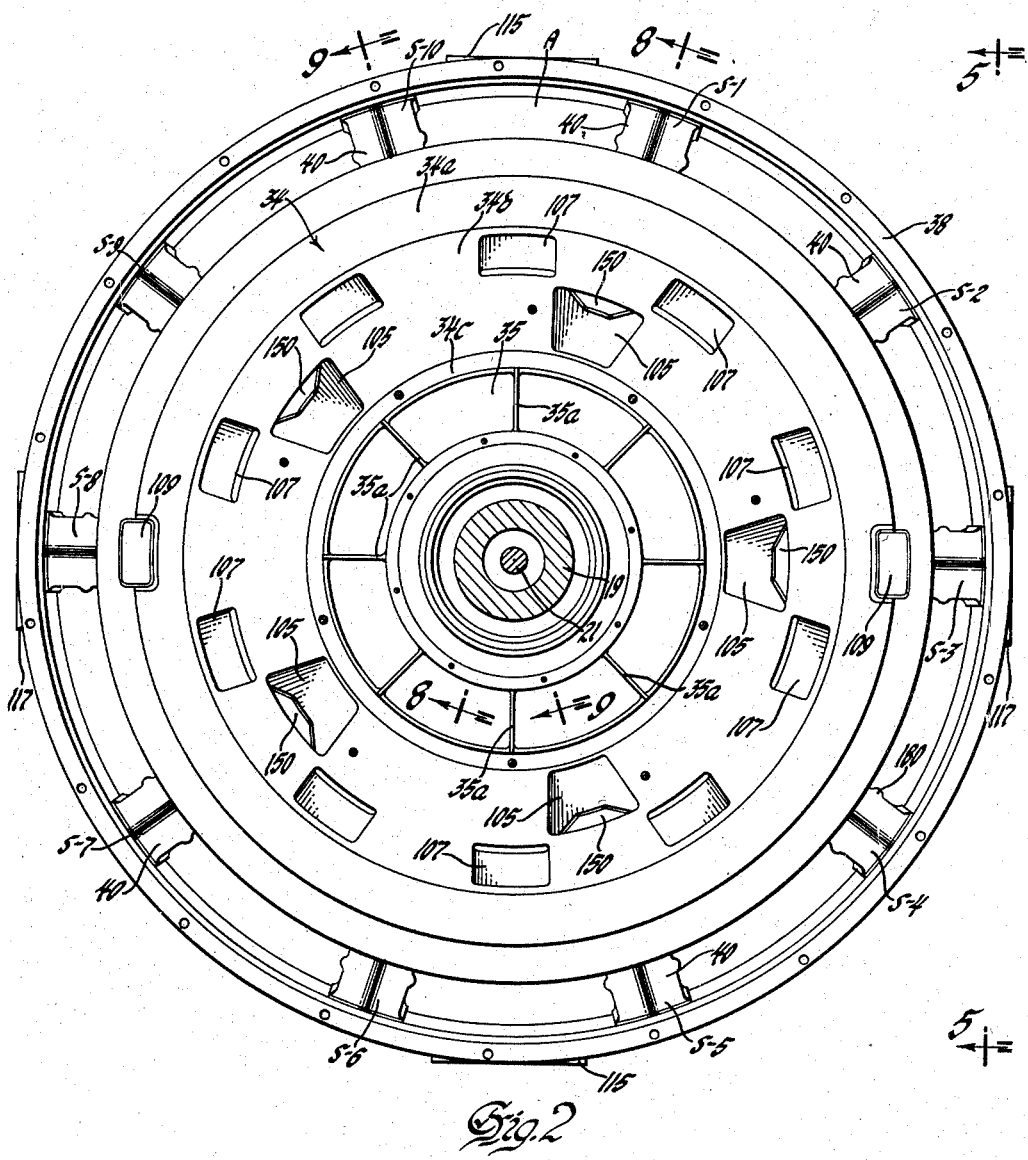
Figure 3:
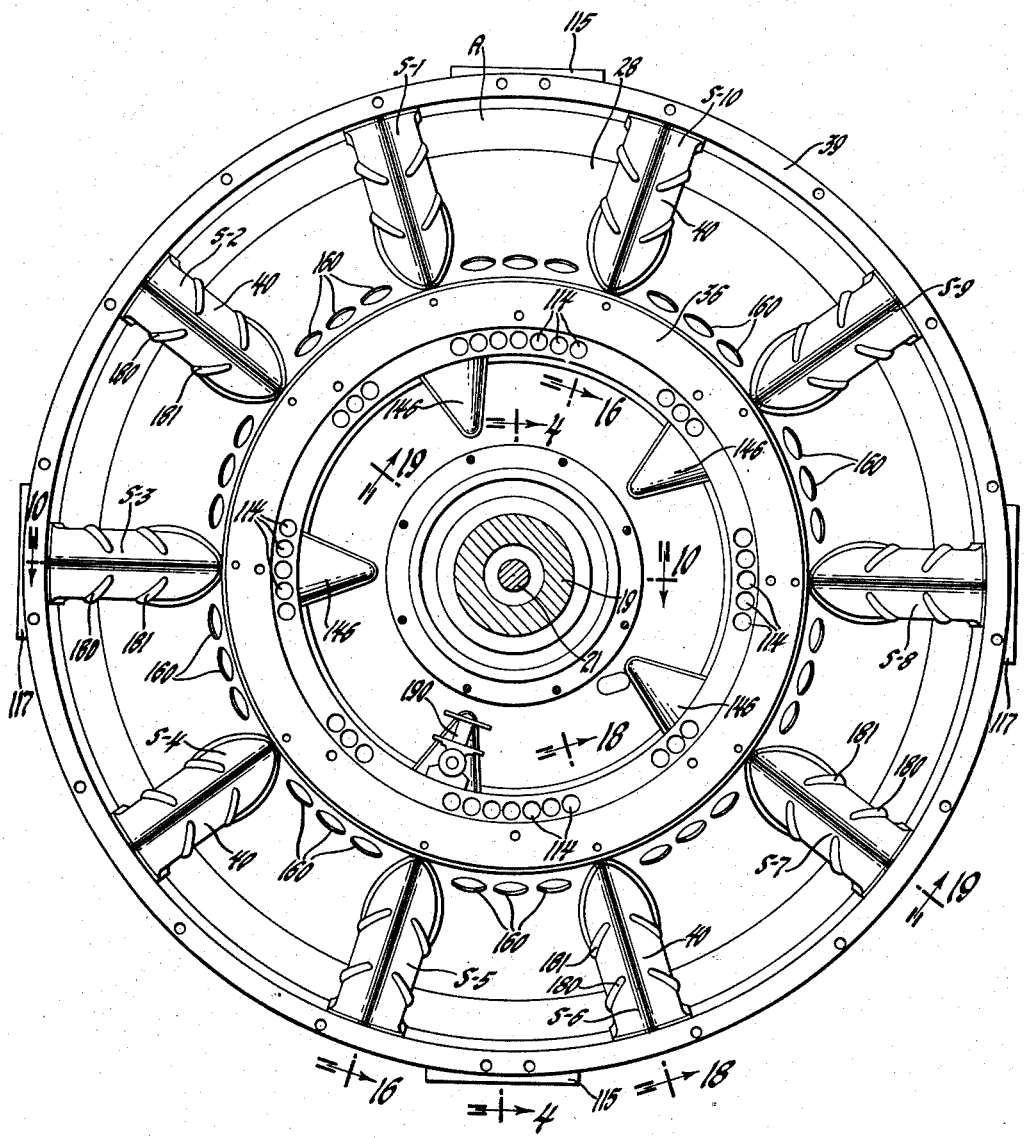
Figure 4:
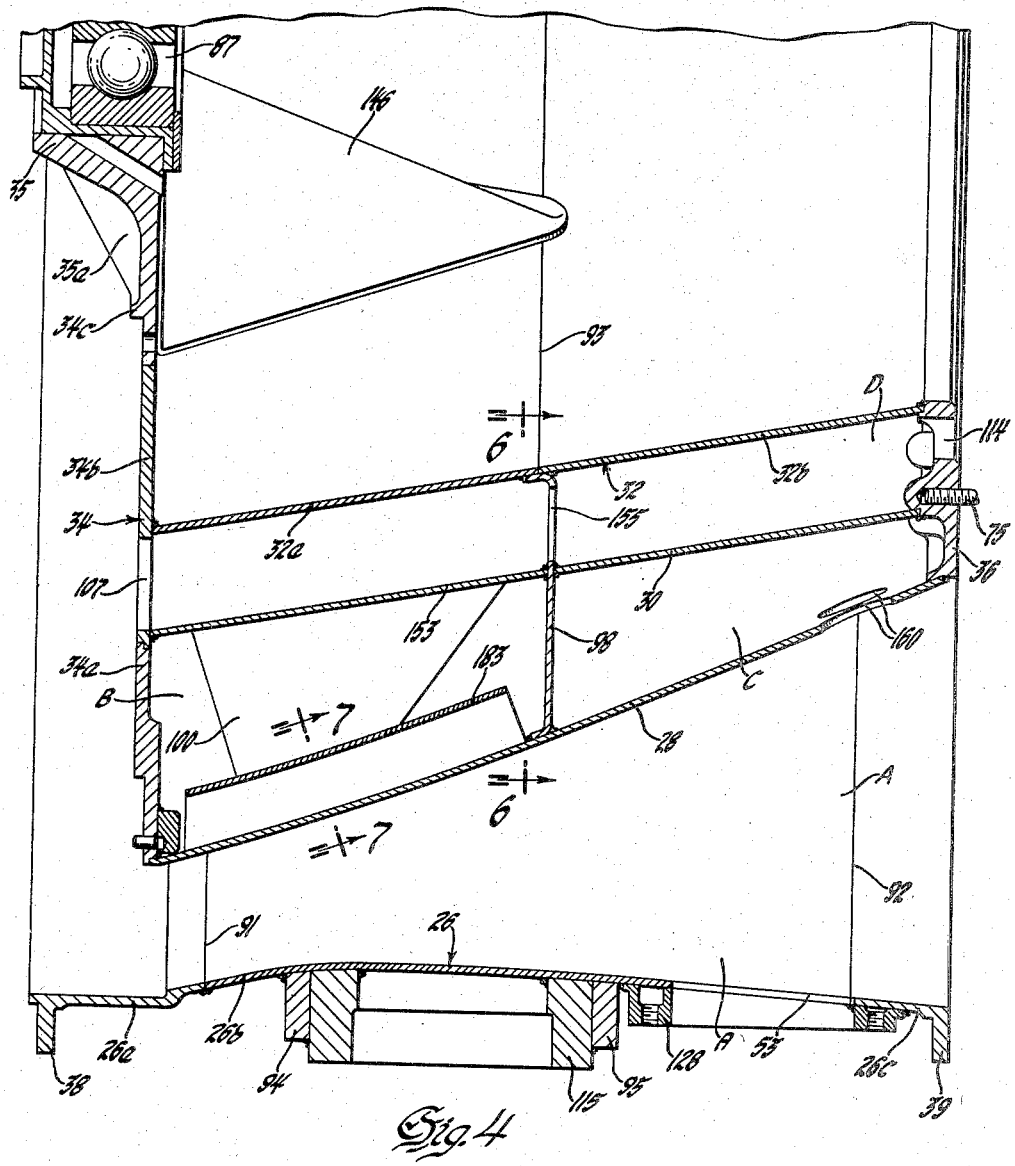
Fig. 4 is a partial longitudinal sectional view taken in the plane indicated in Fig. 3.
Figure 6:
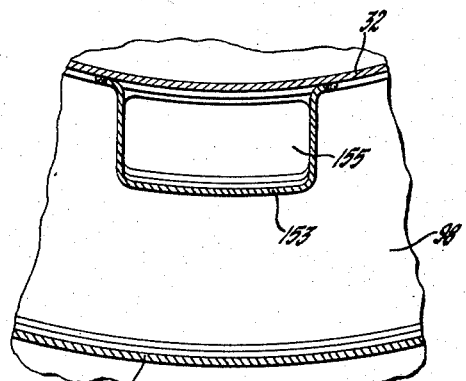
Figure 7:
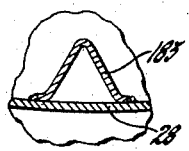
Figure 8:
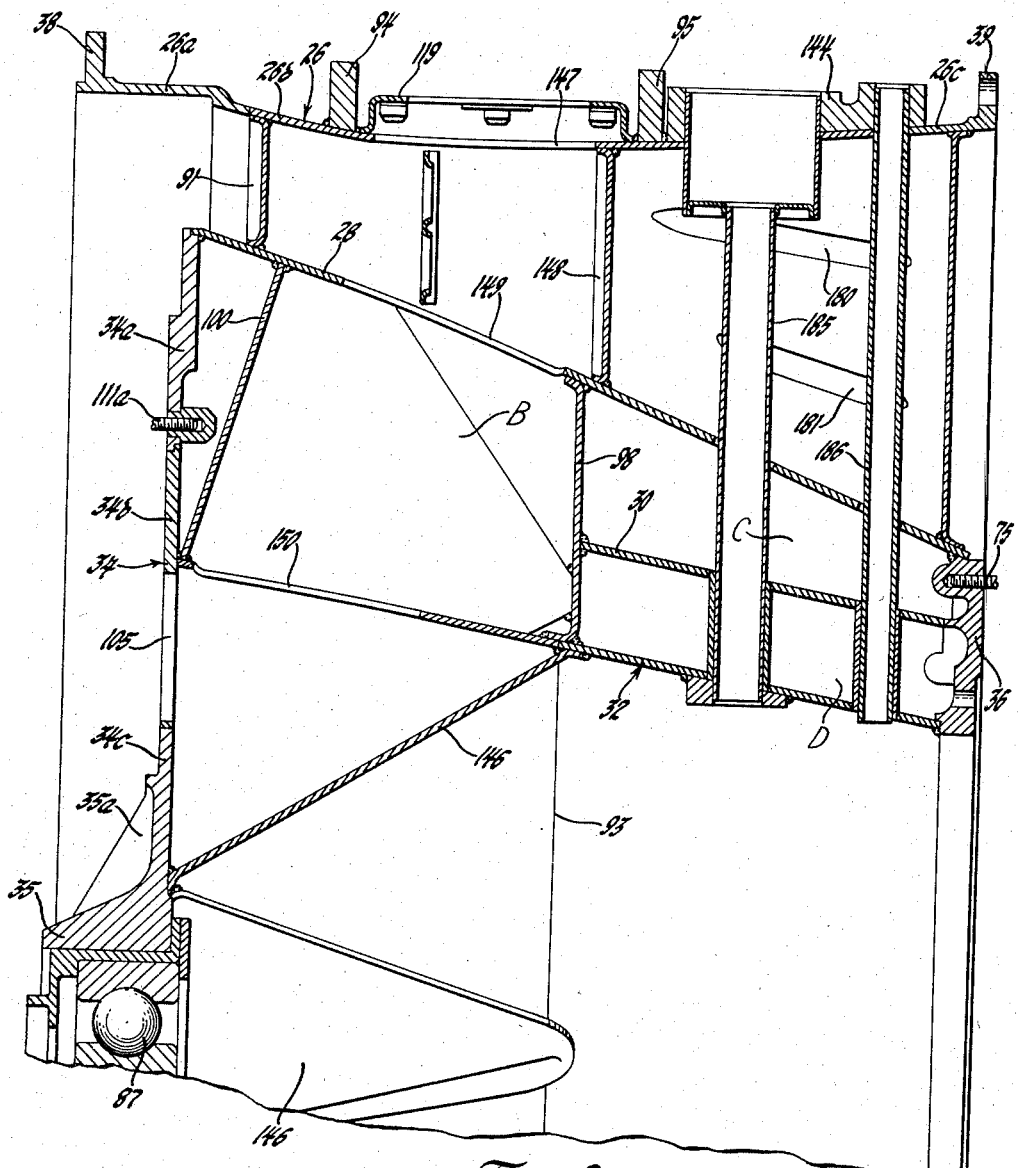
Figure 9:
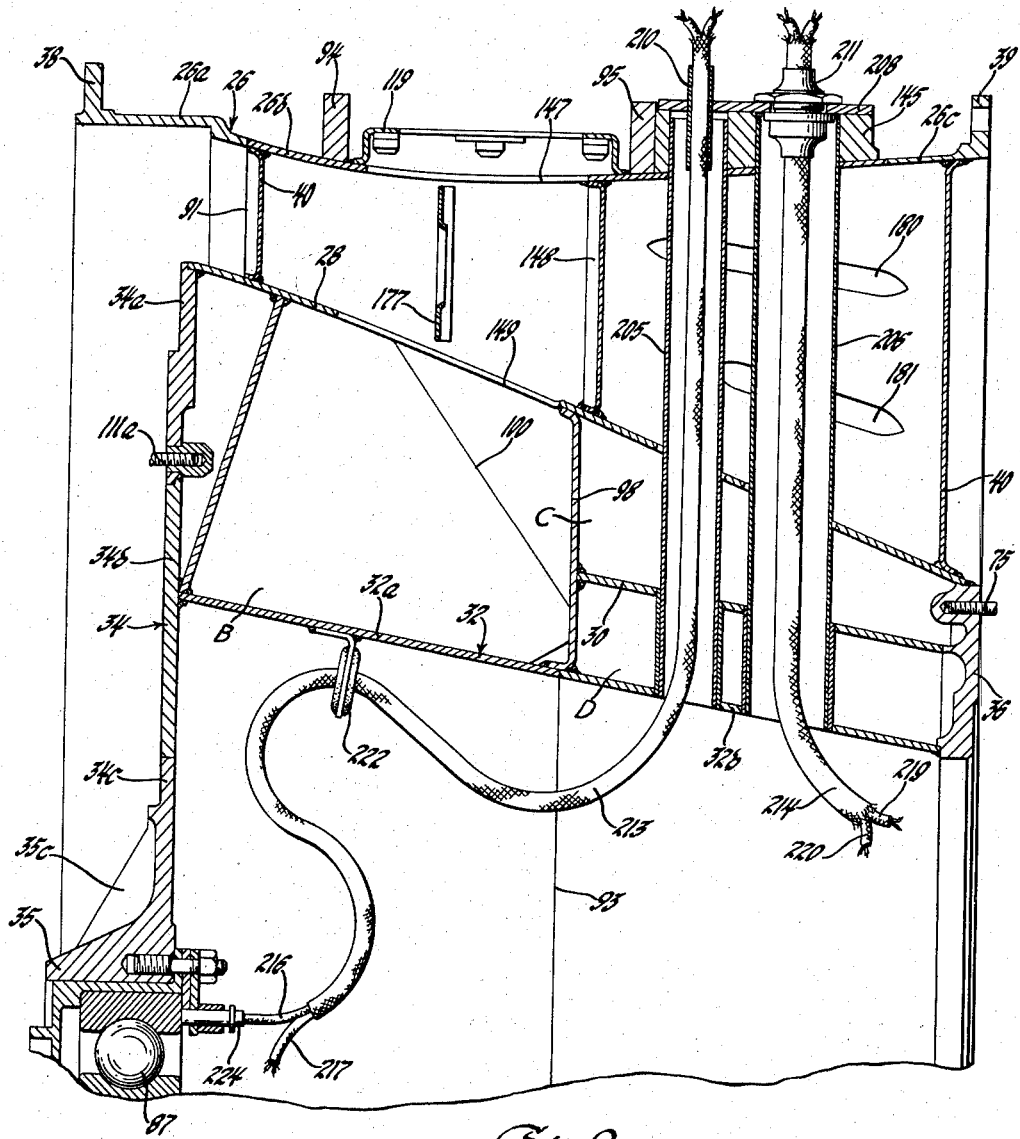
Figure 10:
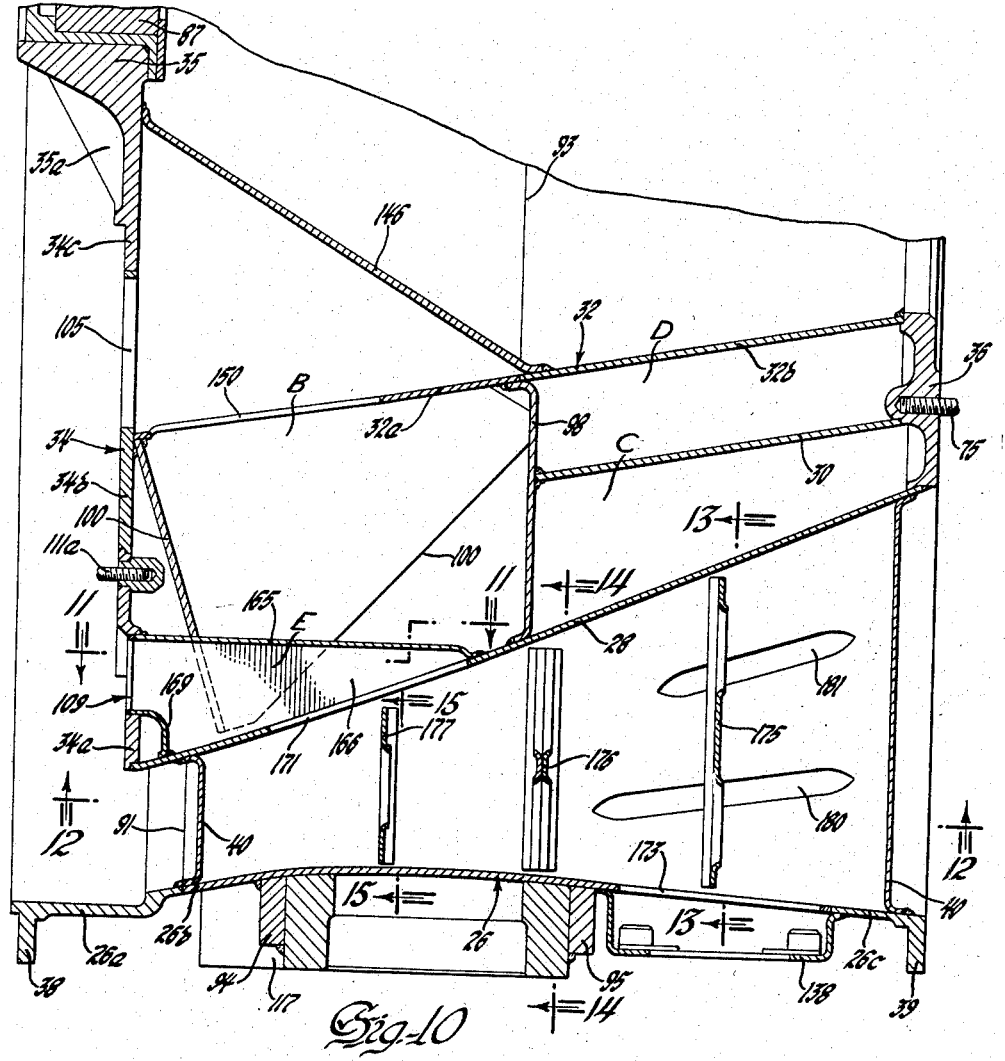

Figs. 6 and 7 are detail sectional views taken in the planes 6—6 and 7—7, respectively, of Fig. 4;

Figs. 8 and 9 are fragmentary longitudinal sectional views taken in the planes 8—8 and 9—9, respectively, of Fig. 2;

Fig. 10 is a fragmentary longitudinal sectional view taken in the plane 10—10 of Fig. 3;

Figs. 11, 12, 13, 14 and 15 are sectional views taken in the planes 11—11, 12—12, 13—13, 14—14 and 15—15, respectively, of Fig. 10;

Fig. 16 is a fragmentary longitudinal sectional view taken in the plane 16—16 of Fig. 3;

Fig. 17 is a sectional view taken in the plane 17—17 of Fig. 16;

Figs. 18 and 19 are fragmentary longitudinal sectional views taken in the planes 18—18 and 19—19, respectively, of Fig. 3; and Figs. 20 and 21 are views taken in the planes 20—20 and 21—21, respectively, of Fig. 19.

Figure 1:
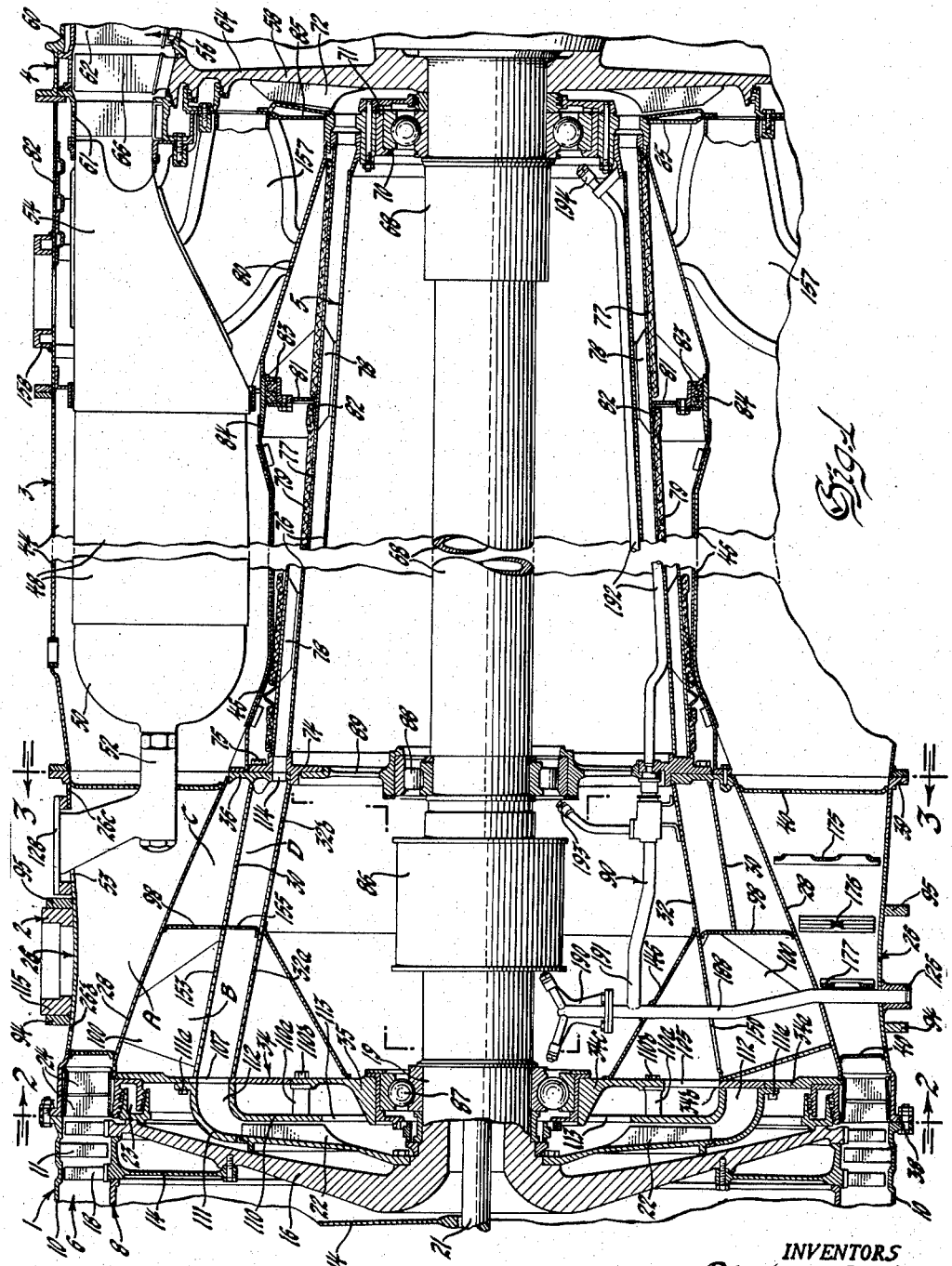

Referring to the drawings, Fig. 1 is a longitudinal sectional view of a portion of a gas turbine aircraft engine which includes a compressor 1, midframe 2, combustion apparatus 3, turbine 4, and aft frame 5. Only certain portions of the engine material to an understanding of the midframe of the present invention are shown, the remainder of the engine being omitted in the interest of clarity of the drawings and conciseness of the specification.

The compressor 1 is of the multi-stage axial flow variety and comprises a stator 6 and a rotor 8. The stator 6 is formed by a split cylindrical casing 10 which is provided with flanged ends and supports a number of spaced annular rows of stator vanes 11. The compressor rotor 8 is of the disk type formed by a plurality of interconnected rotor disks 14 which are disposed between a pair of end disks at the forward and after ends of the compressor. Only the rear end disk 16 is shown. Each of the rotor disks circumferentially mounts a separate row of rotor blades 18 that cooperates with an adjacent row of stator vanes, thereby forming successive stages of the compressor. The end disks are provided with axially extending hubs, as typified by 19, and are secured together in the usual manner by a tie bolt 21 that passes centrally therethrough, whereby the compressor disks are assembled to rotate together as a unit. The hub end of the disk 16 carries a centrifugal fan 22 that serves to induce air from the exterior of the engine into the midframe for cooling purposes, as will be later described. To prevent substantial leakage of compressed air into the interior of the engine, labyrinth seals 23 are provided between the rear rotor disk 16 and the inlet to the midframe 2. The midframe inlet contains two rows of straightening vanes 24 for removing swirl from the compressor discharge.

The midframe 2 of the present invention is of fabricated sheet metal construction and comprises, in brief, a lightweight annular structure formed by a generally cylindrical outer shell 26, a number of conical shells coaxially disposed within the interior of the outer shell including an intermediate shell 28 and a pair of inner shells 30 and 32, and a pair of spaced end plates 34 and 36 joining the ends of the conical shells. The outer shell 26 is provided with integrally formed flanges 38, 39 at the ends thereof for fastening to the compressor 1 and combustion apparatus 3 and defines the outer wall of the annular diffuser passage A that extends between the compressor and combustion apparatus. The inner wall of the diffuser passage is formed by the intermediate shell 28 which diverges from the outer shell and is structurally united thereto by a plurality of equally spaced, hollow support struts 40 that serve to conduct air to and from the various passages within the midframe.

In addition to the diffuser passage A, the midframe also contains the four following sets of air circuits or passages:

(1) Cooling air inlet passages for conducting cooling air from outside the engine into the forward portion of the midframe;

(2) Fan air outlet passages for conducting cooling air rearwardly through the interior of the midframe toward the turbine;

(3) Cabin pressure air passages through which compressed air is bled from the main diffuser passage A to supercharge the aircraft cabin; and (4) Seal leakage air passage through which air leaking through the labyrinth seals 23 at the discharge end of the compressor is ducted overboard through the midframe.

The construction of the midframe, together with the passages formed therein, will be described in greater detail hereinafter.

The combustion apparatus 3 may be of the known "cannular" variety comprising a single annular chamber defined by a flanged outer casing 44 and an inner casing 46 between which are mounted a number of combustion liners or flame tubes 48 extending axially of the engine. Fitted to the forward end of each flame tube 48 is a dome-shaped cap 50, the central portion of which receives the spray tip of an L-shaped fuel nozzle 52 that extends rearwardly from the midframe between adjacent struts 40 thereof and is mounted over one of a number of circular openings 53 equally spaced about the rear portion of the outer shell 26 of the midframe. The after end of each flame tube 48 has a rearwardly diverging conduit or transition liner 54 fitted thereto through which the combustion products are directed into the turbine 4.

The turbine 4 is of the multi-stage type with a stator 56 which comprises a flanged cylindrical casing 60, a nozzle ring 61, and a number of annular rows of stationary vanes 62, and a rotor 58 comprising a number of rotor wheels as 64, each of which carries a row of turbine buckets 66. The rotor wheels 64 are mounted on a tubular shaft 68 which is supported adjacent the forward end of the rotor in a thrust bearing 70 mounted in a housing 71. A centrifugal fan 72 is provided at the forward end of the rotor on the first rotor wheel to facilitate cooling of the rear thrust bearing 70 as will be explained.

The aftframe 5 is a cantilever conical truss member which serves to support the combustion apparatus 3 and the turbine 4 from the midframe 2 and extends axially between the midframe and the turbine. The aftframe comprises a ring 74 fastened by bolts 75 to the rear end plate 36 of the midframe, a generally conical strut comprising an inner wall 76 and a concentrically disposed outer wall 77 spaced from the inner wall by a number of brackets 78, a short conical after portion 80 mounted about the rear portion of the double walled conical strut, and a flanged cylindrical casing 82 fixed to the cylindrical outer casing 44 of the combustion apparatus 3 and the turbine casing 60. The inner and outer walls 76 and 77 of the aftframe converge gradually in their rearward extension toward the turbine and define an annular passage therebetween for conducting cooling air from the midframe to cool the turbine bearing 70 as will be further explained. A heat insulating blanket 79 is disposed about the outer wall 77 of the aftframe to insulate the latter from the inner casing 46 of the combustion apparatus 3. The conical after portion 80 is supported at its forward end by an annular plate 81 having an inner flange 82 welded to the outer wall 77 of the aftframe and an offset or stepped outer flange 83 supporting a ring or collar 84 which in turn supports the after end of the inner casing 46 of the combustion apparatus 3 and the forward end of the conical after portion 80, substantially as shown. The turbine nozzle 61 is supported near the rear end of the aftframe by an offset outwardly extending plate 85 as shown.

The turbine shaft 68 extends centrally through the interior of the aftframe 5 and into the midframe 2 where it is coupled to the stub shaft 19 at the end of the compressor through a conventional coupling 86, the shaft 19 being supported and located by a thrust bearing 87 in the forward end plate 34. The forward end of the turbine shaft 68 is supported in a bearing 88 which is mounted in a spider 89 that is fitted in the ring 74 at the forward end of the aftframe 5. The rear bearing 70, which locates the turbine, is supported in the cage 71 at the rear end of the aftframe as shown. A lubrication system 90, included within the interior of the midframe and aftframe, is provided for lubrication of the compressor and turbine bearings 87, 88 and 70 and the shaft coupling 86.

Referring now more particularly to the construction of the midframe, the principal components thereof, except for the end plates 34 and 36, are formed from sheet metal stock. The outer shell 26 is assembled from three generally cylindrical portions 26a, 26b, and 26c (Fig. 4), which are welded together about the seams 91, 92 formed between the abutting ends thereof, and has a substantially curved spool shape to permit mounting of a pair of spaced stiffener rings 94, 95 which form a collar about its periphery without increasing the overall diameter of the midframe structure. The rings 94, 95 are welded about the curved intermediate portion 26b of the outer shell and serve to reinforce and stiffen the midframe structure.

The struts 40 are of lenticular cross-section as shown in Fig. 12. Each strut is formed from a pair of oppositely curved strips of sheet stock 96, 97 which are welded together along the abutting lateral edges thereof, and are provided with rolled outer and inner edges which are welded to the outer and intermediate shells 26 and 28, respectively. In the specific embodiment of the midframe illustrated herein, ten struts 40 are provided. These are designated as S-1, S-2, . . . S-10 (Figs. 2 and 3) for the purpose of identifying the particular struts associated with the midframe passages.

The conical intermediate shell 28, which is formed from a single piece of sheet metal stock, is welded to the end plates 34 and 36 and defines, with the innermost shell 32 and the end plates, a space that is divided by a bulkhead in the form of a flanged annular partition plate 98 into two axially spaced annular chambers or manifolds in the forward and rear portions, respectively, of the midframe, the forward chamber being designated as B. The partition plate 98 is stamped or otherwise formed from sheet stock and is provided with rolled edges or flanges which are welded to the shells 28 and 32. The annular chamber in the rear portion of the midframe is subdivided into two radially spaced chambers C and D by the inner shell 30 which is concentrically disposed about the innermost shell 32 and is welded to the partition plate 98 and the end plate 36, as shown in Fig. 4. The interior of the midframe thus contains three annular chambers or manifolds B, C, and D, in addition to the main diffuser passage A, as indicated in Figs. 1 and 4, for example.

The innermost shell 32 is formed from a pair of axially disposed conical sections 32a and 32b, which are welded together about the seam 93 formed between the abutting ends thereof, and their opposite ends are welded to the forward and rear end plates, respectively, as shown in Fig. 4. The inner flange of plate 98 bridges the seam 93 between sections 32a, and 32b and is welded to both sections, as shown. The shell 32 is connected to the intermediate shell 28 by ten inner struts 100 (Figs. 1, 8, 16, and 17) which extend across the annular chamber or conduit B and are radially aligned with the main struts 40. The struts 100 have a U-shaped cross-section, as shown in Fig. 17, with lateral arms or sides 101, 102 in the form of an irregular pentagon (Fig. 16), which are welded to the forward portion 32a of the shell 32, the intermediate shell 28, and the partition plate 98.

The forward end plate 34 is assembled from three concentrically disposed ring sections 34a, 34b and 34c (Fig. 4) of cast or forged construction which are welded together to form a circular plate. The inner ring section 34c is formed with a bored hub 35 reinforced by webs 35a and provides a housing for the thrust bearing 87 that locates the compressor rotor 8 of the engine. As shown in Fig. 2, the forward end plate contains three sets of spaced apertures 105, 107 and 109 at different radial distances from the center thereof. The innermost apertures 105, which are provided at five equally spaced places in the intermediate ring section 34b corresponding to the positions of struts S-1, S-3, S-5, S-7 and S-9, discharge cooling air from the midframe to the inlet of cooling fan 22 (Fig. 1). The openings 107, which are provided at ten equally spaced places in the ring section 34b between the struts, receive the discharge from the fan 22. The outermost openings 109, which are provided at two diametrically opposite places in the outer ring section 34a corresponding to the positions of struts S-3 and S-8, discharge leakage air from the ring seals 23 through the midframe into the atmosphere.

The end plate 34 is displaced slightly behind the forward edge of the outer shell 26 and mounts a pair of dish-shaped plates or housing members 110, 111 which house the fan 22 and define a conduit 112 for conducing air from the midframe to and from the fan 22. Air discharging from the innermost openings 105 in the forward end plate 34 of the midframe flows radially inwardly into the annular space between the forward face of the end plate 34 and plate 110 into the fan inlet through a central opening 113 in plate 110 and is directed through the conduit 112 and back into the midframe through the openings 107 in the end plate 34 to be conveyed rearwardly through the midframe. Inner plate 110 is formed with a number of studs or bosses 110a extending therefrom which serve to space the face of the plate from end plate 34 and to facilitate mounting of plate 110 to the end plate by bolts 110b as shown in Fig. 1, the outer plate 111 being fastened to the end plate 34 by bolts 111a, as shown in Fig. 8, for example.

The rear end plate 36 of the midframe is a cast ring which contains a plurality of equally spaced openings 114 (Figs. 1 and 3) therein through which cooling air, which has been conducted from the fan outlet rearwardly through the midframe, is admitted to the annular space defined between the walls 76, 77 of the conical strut of the aftframe to be carried to the turbine bearing 70 and ultimately ducted overboard.

Figure 5:
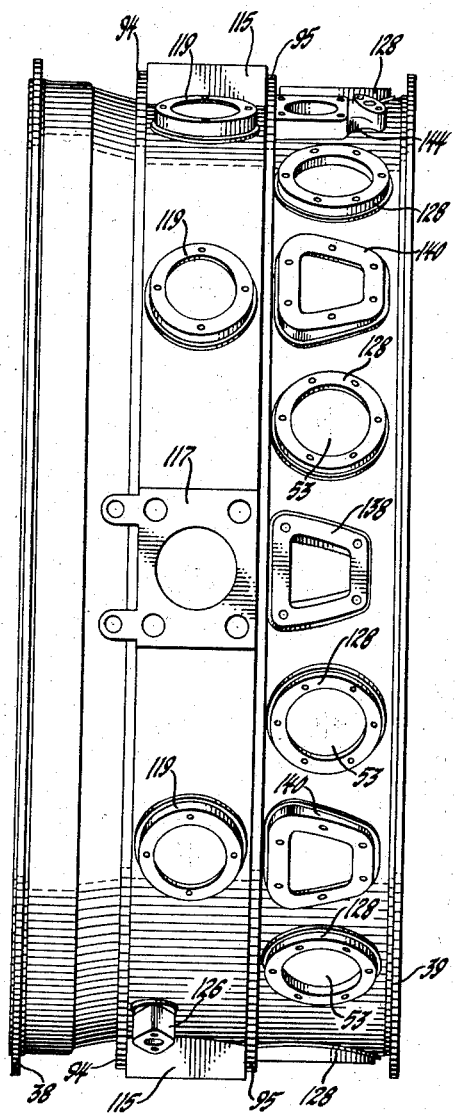
Fig. 5 is a side elevation of the midframe taken in the direction 5—5 of Fig. 2.

Welded about the periphery of the midframe are a plurality of sets of spaced studs or mounting pads as shown in the side elevation view of Fig. 5. The mounting pads near the central portion of the midframe are spaced between the stiffener rings 94, 95 and include two sets of diametrically spaced, engine mounting pads 115, 117, six air intake pads 119 which serve as ports to admit outside cooling air into the midframe, and two oil connection pads 126 and 127 (Figs. 16 and 18) for mounting oil connections for the engine lubrication system. The mounting pads 115, 117, which serve as brackets for mounting of the engine to the craft from the midframe, are welded to the stiffener rings 94, 95 and the outer shell 26 of the midframe and are heavy structural members to which trunnions or other mounting members can be bolted.

The pads spaced about the rear portion of the midframe include ten circular, equally spaced, nozzle pads 128 for mounting the fuel nozzles 52 of the combustion apparatus 3, a pair of diametrically spaced air exhaust pads 138 that serve as outlet ports to exhaust seal leakage air from the interior of the engine, four air pressure or outlet pads 140 for mounting connections to pressurize the cabin of the craft propelled by the engine, a vent pad 144 (Figs. 5 and 8) for mounting vent lines for venting oil fumes collecting in the innermost chambers in the midframe and aftframe from the engine lubrication system, and a thermocouple pad 145 (Fig. 9) for mounting thermocouple connections extending into the interior of the engine. In general, the pads are of the usual type with threaded holes or nuts for bolting down external connections thereto and may be of sheet metal or forged construction.

The two side mounting pads 117 are aligned with the forward portion of struts S-3 and S-8 while the two vertical mounting pads 115 are located between struts S-1, S-10 and S-5, S-6. The six air inlet pads 119 are disposed at the forward portion of struts S-1, S-2, S-4, S-7, S-9 and S-10. Oil connection pads 126 and 127 are disposed at the forward portion of struts S-5 and S-6, respectively. The ten nozzle pads 128 are spaced between adjacent support struts while the two exhaust pads 138 are disposed at the rear portion of struts S-3 and S-8 and behind side mounting pads 117. The four outlet pads 140 are disposed at the rear portion of struts S-2, S-4, S-7 and S-9. Vent pad 144 is located above the rear portion of strut S-1 and thermocouple pad 145 above the rear portion of strut S-10.

In order to facilitate description of the various air passages and circuits within the midframe illustrated herein, the following tabulation of air passages, oil lines, etc. provided in the forward and/or rear portions of the individual struts 40 is given:

| Strut No. | Forward Portion | Rear Portion |
| --- | --- | --- |
| S-1 (Fig. 8) | Cooling Air In | Vent Lines. |
| S-2 | do | Cabin Pressure Air Out. |
| S-3 (Fig. 10) | | Seal Leakage Air Out. |
| S-4 | Cooling Air In | Cabin Pressure Air Out. |
| S-5 (Figs. 1 and 16) | Oil Supply Line | |
| S-6 (Fig. 18) | Oil Drain and Scavenge Lines. | |
| S-7 (Fig. 19) | Cooling Air In | Do. |
| S-8 | | Seal Leakage Air Out. |
| S-9 | Cooling Air In | Cabin Pressure Air Out. |
| S-10 (Fig. 9) | do | Thermocouple Wiring. |

Struts S-2, S-4 and S-9 are generally similar to strut S-7 while strut S-8 corresponds to strut S-3.

*Cooling air inlet passages*

Cooling air is induced into the midframe through the six air inlet pads 119 (Fig. 5), the forward portion of struts S-1, S-2, S-4, S-7, S-9 and S-10 (Figs. 8, 9 and 19), the annular chamber B and five equally spaced fan inlet conduits 146 located radially inwardly of the chamber B. The intake pads 19 are welded over a corresponding number of openings 147 which are formed in the outer shell 26 and communicate with the interior of the above struts. The interior of each of these struts is divided into compartments by a bulkhead or partition plate 148 having rolled edges welded to the inner walls of each strut and to the shells 26 and 28. The cooling air is admitted into the annular chamber B from the conduits or intake passages thus formed in the forward portion of these struts through six openings 149 aligned with the above struts and formed in the forward portion of the intermediate shell 28 and is ducted into the fan inlet conduits 146 through five equally spaced openings 150 (Figs. 8 and 20), which are aligned with the odd numbered struts and are formed in the forward portion 32a of the innermost shell 32.

The fan inlet conduits 146 correspond to the positions of the odd struts S-1, S-3, S-5, S-7 and S-9 as shown in Fig. 3 and are formed by V-shaped gusset members, the edges of which are welded to the inner surface of the shell 32 and the forward end plate 34 as shown in Figs. 8, 10, 16, 19 and 20. From the conduits 146 the cooling air is directed through the five innermost apertures 105 in end plate 34, into the space 113 formed between end plate 34 and fan housing member 110, past the bearing 87, and into the inlet 113 of the fan 22 as shown in Fig. 1.

Fan air outlet passages

From the fan 22 the cooling air is directed through the conduit 112 and the apertures 107 in the forward end plate 34 into ten equally spaced channel members 153 (Figs. 4 and 6) which are welded to the forward portion 32a of the innermost shell 32, the end plate 34 and bulkhead 98 so as to form fan discharge conduits extending through the annular chamber B (Figs. 1 and 4). The bulkhead 98 has ten equally spaced apertures 155 formed therein as shown in Fig. 6 which communicate with the annular chamber D in the rear portion of the midframe. From the annular chamber D the cooling air is directed through the circular openings 114 (Figs. 1 and 3) in the rear end plate 36 and into the annular space defined between the inner and outer walls 76 and 77 of the aftframe 5 to cool the rear thrust bearing 70 of the engine. The cooling air is then directed overboard by the outlet fan 72 at the forward end of the turbine through ten elbows, one of which is shown at 157 extending radially between adjacent transition liners 54 of the combustion apparatus 3 to ten cooling air outlet pads 158 which are welded to the casing 82 of the aftframe 5, as shown in Fig. 1.

Cabin pressure air passages

Air for pressurizing the aircraft cabin is obtained by bleeding part of the air flowing through the annular diffuser passage A inwardly into the adjacent annular chamber C in the rear portion of the midframe through a plurality of circular openings 160 (Figs. 3 and 4) near the rear end of the intermediate shell 28, the openings 160 being disposed between the struts 40. The cabin air flows outwardly from the annular chamber C through four openings 161, shown in Figs. 19 and 21, which are formed in the intermediate shell 28 and communicate with the rear portion of the main struts S-2, S-4, S-7 and S-9 which provide outlet passages for the compressed air, the forward portion of these struts serving as intake conduits or passages to admit cooling air into the midframe, as has been described. The cabin air is withdrawn from the rear portion of the interior of the aforementioned struts through four openings one of which is shown at 163 (Fig. 19), which are formed in the intermediate portion 26b of the outer shell 26, and through the cabin pressure pads 140 of Fig. 5.

Seal leakages passages

Figure 11:
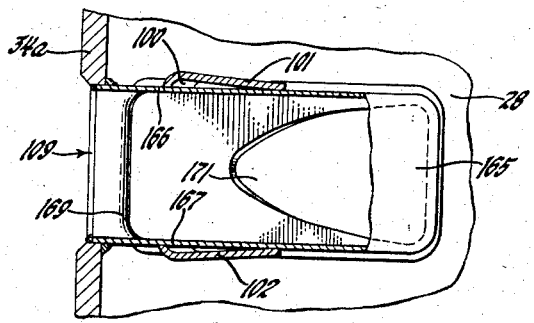

In order to prevent the building up of pressure on the back face of the rear compressor disk 16 and consequent loading of the compressor thrust bearing 87 caused by the accumulation of air leaking through the labyrinth seals 23 at the discharge end of the compressor of Fig. 1, the seal leakage air is ducted through the two outermost openings 109 (Fig. 2) in the forward end plate 34 and through a pair of seal leakage outlet conduits E which are contained in the outer portions of the annular chamber B as shown in Fig. 10. The conduits E are each formed by a wedge-shaped channel 165 with outwardly extending flanges 166, 167 (Fig. 11) having rolled edges and are welded to the inner surface of the intermediate shell 28 and the outer ring section 34a of the forward end plate 34, and a bent strip or bridging member 169 which is welded to the flanges 166, 167, the end plate 34 and shell 28, as shown in Figs. 10 and 11. The conduits E are aligned with and communicate with the interior of main struts S-3 and S-8 through openings 171 (Figs. 10, 11 and 12) in the inner shell 28. The seal leakage air is removed from the interior of the struts which provide exhaust passages for the leakage air through openings 173 in the outer shell 26 and the seal leakage pads 138 (Fig. 5) disposed axially behind the engine mounting pads 117.

The forward edge of the two inner struts 100, which are aligned with the struts S-3 and S-8, is notched so as to allow the channels 165 to extend longitudinally therethrough between the sides 101, 102 thereof as shown in Figs. 10 and 11. The interior of the main support struts S-3 and S-8 is reinforced by a plurality of spaced stiffeners 175, 176 and 177 which extend between and are welded to the sides thereof, portions of the stiffener members being notched or apertured to permit air to flow therethrough as shown in Figs. 13, 14 and 15. Similar stiffener members are provided within the interior of each of the other main struts of the midframe structure. Additional reinforcement is obtained by provision of embossments 180, 181 formed in the lateral surfaces near the rear portion of each of the main struts 40.

The intermediate shell 28 of the midframe is reinforced by a pair of diametrically spaced V-shaped channel members 183 welded to the inner surface of the shell 28 between adjacent support struts S-1 and S-10, and S-5 and S-6, respectively, as shown in Figs. 4 and 7.

Lubrication system

Turning now to the engine lubrication system 90, the rear part of the main strut S-1 (Fig. 8) contains a pair of vent lines 185, 186 extending from the pad 144 radially through the annular chambers C and D for venting the bearing chamber formed within the interior of the innermost shell 32 of the midframe and thereby the interior of the aftframe 5.

Main strut S-5 (Fig. 16), which is not associated with a pad connected to any of the air passages within the midframe, contains an oil supply line 188 which extends from the pad 126 radially through the forward portion of the strut, the annular chamber B and an aligned gusset 146 and is connected to a spray nozzle 190 (Fig. 1) for lubricating the bearing 87 and the shaft coupling 86. Lines 191 and 192 extending longitudinally through the interior of the midframe and aftframe are connected to the oil pressure line 188 and supply spray nozzles 193 and 194, respectively, for lubricating the bearings 88 and 70 at the forward and rear ends of the turbine shaft 68.

Strut S-6 contains an oil drain line 196 and a scavenge oil line 197 (Fig. 18) extending radially from the mounting pad 127 through the annular chamber B. The forward portion 32a of the innermost shell 32 in the vicinity of drain line 196 is deformed to form a pan 199 in which oil sprayed on the engine bearings is collected to be drained through the line 196. The inner end of the oil scavenge line 197 is connected to a pad 201 for mounting an oil scavenge pump (not shown).

Inasmuch as the specific details of the engine lubrication system are not material to an understanding of the present invention, only a part of the lubrication system has been shown to illustrate that the midframe of the present invention is adapted to accommodate various oil lines and connections for the engine.

Thermocouple wiring

The rear portion of strut S-10 contains a pair of tubes 205, 206 which extend from pad 145 through the strut and the annular chambers C and D, and communicate with the bearing chamber or innermost cavity in the midframe, as shown in Fig. 9. Fastened to the pad 145 is a cover plate 208 which contains a pair of bushings 210 and 211 through which cables 213, 214 each containing two sets of thermocouple leads 216, 217 and 219, 220, respectively are inserted into the tubes 205, 206. Cable 213 is supported from the inner wall of the forward portion 32a of the innermost shell 32 by an eye bracket 222 and has the thermocouple leads contained therein connected to thermocouples, one of which is shown at 224, supported from the back hub 35 of the forward end plate 34 to measure the temperature of the thrust bearing 87. The thermocouple leads contained in cable 214 are connected similarly to thermocouples (not shown) to measure the temperature of the bearing 88 of Fig. 1.

There is thus provided a fabricated midframe structure which consists substantially entirely of a welded sheet metal assembly possessing the structural strength, rigidity and durability required for high performance jet aircraft power plants and which affords an appreciable reduction in engine weight. The compact design and provision of cooling air passages through the midframe contributes to improving the operation of the engine and, notwithstanding the complex internal configuration thereof, the midframe of the present invention is well suited to simple and rapid manufacturing processes. Although a specific embodiment of the invention has been shown and described, it will be understood that it is but illustrative and that various modifications may be made therein without departing from the spirit and scope of the invention.

What is claimed is:

1. A gas turbine engine comprising, in combination, a compressor, a cooling fan mounted at the rear of the compressor, an annular midframe defining a diffuser passage for the compressor, a combustion apparatus supplied through the said passage, a turbine powered by the combustion apparatus, and a drive shaft extending from the turbine to the compressor through the midframe, the said midframe comprising an outer shell defining the outer wall of the said passage, a shell diverging from said outer shell defining the inner wall of said passage, a plurality of struts extending across the said passage between the said shells and structurally uniting the shells, an annular air conduit radially inward of the said inner wall of said passage, intake passages extending through some of said struts to the said annular conduit, fan inlet conduits extending from said annular conduit to said fan, and a fan discharge conduit extending longitudinally of the midframe from the said fan.

2. A gas turbine engine comprising, in combination, a compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said diffuser passage, a turbine powered by the combustion apparatus, and a drive shaft extending from the turbine to the compressor through the midframe, the said midframe comprising an outer shell defining the outer wall of the said passage, an inner shell diverging from said outer shell defining the inner wall of said passage, a plurality of struts extending across the said passage between the said shells and structurally uniting the shells, an end plate at one end of the said inner shell, an outlet conduit within said inner shell extending between the inner shell and said end plate, said end plate having at least one opening therein communicating with said outlet conduit to admit seal leakage air thereinto, and an exhaust passage in at least one of said struts communicating with said outlet conduit to exhaust seal leakage air outside of the engine.

3. A gas turbine engine comprising, in combination, a compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said passage, a turbine powered by the combustion apparatus, and a drive shaft extending from the turbine to the compressor through the midframe, the said midframe comprising an outer shell defining the outer wall of the said passage, an inner shell diverging from said outer shell defining the inner wall of said passage, a plurality of struts extending across the said passage between the said shells and structurally uniting the shells, an end plate at one end of the said inner shell, outlet conduits within said inner shell extending between the inner shell and said end plate, said end plate having a plurality of openings therein communicating with said outlet conduits to admit seal leakage air thereinto, and exhaust passages in some of said struts communicating with said outlet conduits to exhaust seal leakage air outside of the engine.

4. A gas turbine engine comprising, in combination, a compressor, a cooling fan mounted at the rear of the compressor, an annular midframe defining a diffuser passage for the compressor, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the said diffuser passage between the said shells and structurally uniting the shells, said midframe further including cooling air passages for admitting outside air through some of said struts into the midframe for cooling various parts of the engine and pressure passages for delivering compressed air externally of the engine through others of said struts.

5. A gas turbine engine comprising, in combination, a compressor, a cooling fan mounted at the rear of the compressor, an annular midframe defining a diffuser passage for the compressor, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the said diffuser passage between the said shells and structurally uniting the shells, said midframe further including cooling air passages for admitting outside air through some of said struts into the midframe for cooling various parts of the engine and pressure outlet passages for delivering compressed air externally of the engine through some of struts, some of said struts including both cooling air intake passages and pressure outlet passages.

6. A gas turbine engine comprising, in combination, a compressor, a cooling fan mounted at the rear of the compressor, an annular midframe defining a diffuser passage for the compressor, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the said diffuser passage between the said shells and structurally uniting the shells, said midframe further including cooling air passages for admitting outside air into the midframe for cooling various parts of the engine and pressure passages for delivering compressed air externally of the engine, said cooling air passages comprising intake passages in some of said struts, an annular air conduit within said inner shell communicating with the said strut intake passages, fan inlet conduits from said annular air conduit to said cooling fan and fan discharge conduits from said cooling fan extending longitudinally of said midframe, said pressure passages comprising outlet passages in some of said struts and conduit means within said inner shell communicating with said strut outlet passages and said diffuser passage.

7. A gas turbine engine comprising, in combination, a compressor, a cooling fan mounted at the rear of the compressor, an annular midframe defining a diffuser passage for the compressor, a combustion apparatus supplied through the said diffuser passage, a turbine powered by the combustion apparatus, and a drive shaft extending from the turbine to the compressor through the midframe, the said midframe comprising an outer shell defining the outer wall of the said diffuser passage, an intermediate shell diverging from said outer shell defining the inner wall of said diffuser passage, a plurality of struts extending across the said diffuser passage between said shells and structurally uniting the shells, two inner shells within said intermediate shell, an end plate joining said intermediate and inner shells, said intermediate shell having a plurality of openings therein to admit air from the said diffuser passage into the space between the said intermediate shell and the adjacent inner shell, outlet passages in some of said struts to deliver compressed air from the said space externally of the engine, intake passages in some of said struts to admit outside air to the cooling fan, and a fan discharge conduit extending from said fan longitudinally of the midframe.

8. A gas turbine engine comprising, in combination, a compressor, a cooling fan mounted at the rear of the compressor, an annular midframe defining an outlet passage for the compressor, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an intermediate shell diverging from said outer shell defining the inner wall of said diffuser passage, a plurality of struts extending across said diffuser passage between the said shells and structurally uniting the shells, two inner shells within the intermediate shell, an end plate joining the intermediate and inner shells, said intermediate shell having a plurality of openings therein to admit air from the said diffuser passage into the space between the intermediate shell and the adjacent inner shell, outlet passages in some of said struts to deliver compressed air from the said space externally of the engine, intake passages in some of said struts to admit outside air to the cooling fan, and a fan discharge conduit extending from said fan longitudinally of the midframe between said inner shells, and partitioning means in some of said struts to divide the interiors thereof to accommodate both outlet and intake passages.

9. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the diffuser passage between the said shells and structurally uniting the shells, said midframe further including cooling air intake passages for admitting outside air through some of said struts into the midframe and exhaust passages through others of said struts for exhausting seal leakage air from said fluid seal through said midframe.

10. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the diffuser passage between the said shells and structurally uniting the shells, said midframe further including cooling air passages for admitting outside air into the midframe and seal leakage exhaust passages for exhausting seal leakage air from said fluid seal through said midframe, said cooling air passages comprising intake passages in some of said struts, an annular air conduit within said inner shell communicating with said strut intake passages, fan inlet conduits from said annular air conduit to said cooling fan and fan discharge conduits from said cooling fan extending longitudinally of said midframe; and said seal leakage exhaust passages comprising exhaust passages in others of said struts and a second conduit means within said inner shell and communicating with said strut exhaust passages and said fluid seal.

11. A gas turbine engine comprising, in combination, a compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said diffuser passage, a turbine powered by the combustion apparatus, and a drive shaft extending from the turbine to the compressor through the midframe, the said midframe comprising an outer shell defining the outer wall of the said diffuser passage, an intermediate shell diverging from said outer shell defining the inner wall of said diffuser passage, a plurality of struts extending across said diffuser passage between said shells and structurally uniting the shells, an inner shell within said intermediate shell, an end plate joining the intermediate and inner shells, said intermediate shell having a plurality of openings therein to admit air from the said diffuser passage into the space between the intermediate and inner shells, outlet passages in some of said struts to deliver compressed air from the said space between said intermediate and inner shells externally of the engine, a conduit within said intermediate shell extending between the intermediate shell and said end plate, said end plate having at least one opening therein communicating with said conduit to admit seal leakage air thereinto, and an exhaust passage in at least one of said struts communicating with said conduit to exhaust seal leakage air outside of the engine.

12. A gas turbine engine comprising, in combination, a compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said diffuser passage, a turbine powered by the combustion apparatus, and a drive shaft extending from the turbine to the compressor through the midframe, the said midframe comprising an outer shell defining the outer wall of the said diffuser passage, a shell diverging from said outer shell defining the inner wall of said diffuser passage, a plurality of struts extending across said diffuser passage between the said shells and structurally uniting the shells, an inner shell within said intermediate shell, an end plate joining the intermediate and inner shells, said intermediate shell having a plurality of openings therein to admit air from said diffuser passage into the space between the intermediate and inner shells, outlet passages in some of said support struts to deliver compressed air from the space between said intermediate and inner shells externally of the engine, conduits within said intermediate shell extending between the intermediate shell and said end plate, said end plate having a plurality of openings therein communicating with said conduits to admit seal leakage air thereinto, and exhaust passages in others of said struts communicating with said conduits to exhaust seal leakage air outside of the engine.

13. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the diffuser passage between the said shells and structurally uniting the shells, said midframe further including cooling air intake passages for admitting outside air through some of said struts into the midframe, pressure outlet passages for delivering compressed air externally of the engine through others of said struts and seal leakage exhaust passages for exhausting seal leakage air from said fluid seal through said midframe through still others of said struts.

14. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage, a combustion apparatus supplied through the said passage, a turbine powered by the combustion apparatus, and a drive shaft extending from the turbine to the compressor through the midframe, the said midframe comprising an outer shell defining the outer wall of the said diffuser passage, an inner shell diverging from said outer shell defining the inner wall of said diffuser passage, a plurality of struts extending across the diffuser passage between the said shells and structurally uniting the shells, said midframe further including cooling air passages for admitting outside air into the midframe, pressure passages for delivering compressed air externally of the engine and seal leakage exhaust passages for exhausting seal leakage air from said fluid seal through said midframe; said cooling air passages comprising intake passages in some of said struts, an annular air conduit within said inner shell communicating with said strut intake passages, fan inlet conduits from said annular air conduit to said cooling fan and fan discharge conduits from said cooling fan extending longitudinally of said midframe; said pressure passages comprising outlet passages in some of said struts and a first conduit means within said inner shell and communicating with said strut outlet passages; and said seal leakage exhaust passages comprising exhaust passages in some of said struts and a second conduit means within said inner shell and communicating with said strut exhaust passages and said fluid seal.

15. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said diffuser passage, a turbine powered by the combustion apparatus, and a drive shaft extending from the turbine to the compressor through the midframe, the said midframe comprising an outer shell defining the outer wall of said diffuser passage, an intermediate shell diverging from said outer shell defining the inner wall of said diffuser passage, a plurality of struts extending across said diffuser passage between the said shells and structurally uniting the shells, two inner shells within the intermediate shell, an end plate joining the ends of the said intermediate and said inner shells, said intermediate shell having a plurality of openings therein to admit air from the said diffuser passage into the space between the intermediate shell and the adjacent inner shell, outlet passages in some of said struts to deliver compressed air from the said space between the intermediate shell and the adjacent inner shell externally of the engine, intake passages in some of said struts to admit outside air to said cooling fan, fan discharge conduits from said cooling fan extending longitudinally of the midframe between the said inner shells, conduits within said intermediate shell extending between the intermediate shell and said end plate, said end plate having a plurality of openings therein communicating with said conduits to admit seal leakage air thereinto, and exhaust passages in some of said struts communicating with said conduits to exhaust seal leakage air outside of the engine.

16. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said passage, a turbine powered by the combustion apparatus, and a drive shaft extending from the turbine to the compressor through the midframe, the said midframe comprising an outer shell defining the outer wall of said diffuser passage, an intermediate shell diverging from said outer shell defining the inner wall of said diffuser passage, a plurality of struts extending across said diffuser passage between the said shells and structurally uniting the shells, two inner shells within the intermediate shell, an end plate joining the ends of said intermediate and said inner shells, said intermediate shell having a plurality of openings therein to admit air from the said diffuser passage into the space between the intermediate shell and the adjacent inner shell, outlet passages in some of said struts to deliver compressed air from said space externally of the engine, intake passages in some of said struts to admit outside air to said cooling fan, fan discharge conduits from said cooling fan extending longitudinally of the midframe between the said inner shells, conduits within said intermediate shell extending between the intermediate shell and said end plate, said end plate having a plurality of openings therein communicating with said conduits to admit seal leakage air thereinto, exhaust passages in some of said struts communicating with said conduits to exhaust seal leakage air outside of the engine and partitioning means in some of struts to divide the interior thereof to accommodate both outlet and intake passages.

17. A gas turbine engine comprising, in combination, a compressor, a cooling fan mounted at the rear of the compressor, an annular midframe defining a diffuser passage for the compressor, a combusion apparatus supplied through the said diffuser passage, a turbine powered by the combustion apparatus, and a drive shaft extending from the turbine to the compressor through the midframe, the said midframe comprising an outer shell defining the outer wall of the said diffuser passage, an intermediate shell diverging from said outer shell defining the inner wall of said diffuser passage, a plurality of struts extending across the said diffuser passage between the said shells and structurally uniting the shells, a first inner shell within said intermediate shell, forward and rear end plates joining the ends of said intermediate shell and said first inner shell, an annular partition plate axially spaced between said end plates for dividing the space between said intermediate shell and said first inner shell into a pair of axially spaced forward and rear annular chambers within said midframe, a second inner shell spaced radially between said intermediate shell and said first inner shell and extending longitudinally between said partition plate and said rear end plate for dividing the said axially spaced rear chamber into two radially spaced chambers between said intermediate shell and said first inner shell, said intermediate shell having a plurality of openings therein to admit air from said diffuser passage into the adjacent one of said rear radially spaced chambers, an outlet passage in at least one of said struts to deliver compressed air from said last mentioned chamber externally of the engine, an intake passage in at least one of said struts to admit outside air into the forward one of said axially spaced chambers, at least one fan inlet conduit within said first inner shell and extending from said axially spaced forward chamber to said cooling fan, and at least one discharge conduit from said cooling fan extending longitudinally through said axially spaced forward chamber into the innermost one of said rear radially spaced chambers for conducting cooling air longitudinally through said midframe.

18. A gas turbine engine comprising, in combination, a compressor, a cooling fan mounted at the rear of the compressor, an annular midframe defining a diffuser passage for the compressor, a combustion apparatus supplied through the said diffuser passage, a turbine powered by the combustion apparatus, and a drive shaft extending from the turbine to the compressor through the midframe, the said midframe comprising an outer shell defining the outer wall on the said diffuser passage, an intermediate shell diverging from said outer shell defining the inner wall of said diffuser passage, a plurality of struts extending across the said diffuser passage between the said shells and structurally uniting the shells, a first inner shell within said intermediate shell, forward and rear end plates joining the ends of said intermediate shell and said first inner shell, an annular partition plate axially spaced between said end plates for dividing the space between said intermediate and first inner shells into a pair of axially spaced forward and rear annular chambers within said midframe, a second inner shell spaced radially between said intermediate and said first inner shell and extending longitudinally between said partition plate and said rear end plate for dividing the said axially spaced rear chamber into two radially spaced chambers between said intermediate shell and said first inner shell, said intermediate shell having a plurality of openings therein to admit air from said diffuser passage into the adjacent one of said rear radially spaced chambers, outlet passages in some of said struts to deliver compressed air from said last mentioned chamber externally of the engine, intake passages in some of said struts to admit outside air into the forward one of said axially spaced chambers, fan inlet conduits within said first inner shell and extending from said axially spaced forward chamber to said cooling fan, fan discharge conduits from said cooling fan extending longitudinally through said axially spaced forward chamber into the innermost one of said rear radially spaced chambers for conducting cooling air longitudinally through said midframe, and a partition plate in some of said struts to divide the interiors thereof to accommodate both outlet and intake passages.

19. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said diffuser passage, a turbine powered by the combustion apparatus, and a drive shaft extending from the turbine to the compressor through the midframe, the said midframe comprising an outer shell defining the outer wall of the said diffuser passage, an intermediate shell diverging from said outer shell defining the inner wall of said diffuser passage, a plurality of struts extending across the said diffuser passage between the said shells and structurally uniting the shells, a first inner shell within said intermediate shell, forward and rear end plates joining said intermediate shell and said first inner shell, an annular partition plate axially spaced between said end plates for dividing the space between said intermediate shell and said first inner shell into a pair of axially spaced forward and rear annular chambers within said midframe, a second inner shell spaced radially between said intermediate shell and said first inner shell and extending longitudinally between said annular partition plate and said end plate for dividing said axially spaced rear annular chamber into two radially spaced chambers, said intermediate shell having a plurality of openings therein to admit compressed air into the adjacent one of said rear radially spaced chambers, an outlet passage in at least one of said struts from said adjacent radially spaced chamber to deliver compressed air externally of the engine; an intake passage in at least one of said struts to admit outside air into said axially spaced forward chamber, a fan inlet conduit within said first inner shell extending from said forward chamber to said cooling fan, and a fan discharge conduit from said cooling fan extending longitudinally through said axially spaced forward chamber into the innermost one of said rear radially spaced chambers between said first and second inner shells for conducting cooling air longitudinally through said midframe; a seal leakage conduit within said intermediate shell extending between the intermediate shell and the forward end plate, and an exhaust passage in at least one of said struts communicating with said conduit to exhaust seal leakage air outside of the engine.

20. A gas turbine engine comprising, in combination, a compressor, a cooling fan mounted at the rear of the compressor, an annular midframe defining a diffuser passage for the compressor, a fluid seal at the discharge end of the compressor to prevent substantial leakage of air supplied to the inlet of said diffuser passage into the interior of the engine, a combustion apparatus supplied through the said diffuser passage, a turbine powered by the combustion apparatus, and a drive shaft extending from the turbine to the compressor through the midframe, the said midframe comprising an outer shell defining the outer wall of the said diffuser passage, an intermediate shell diverging from said outer shell defining the inner wall of said diffuser passage, a plurality of struts extending across the said diffuser passage between the said shells and structurally uniting the shells, a first inner shell within said intermediate shell, forward and rear end plates joining said intermediate shell and said first inner shell, an annular partition plate axially spaced between said end plates for dividing the space between said intermediate shell and said first inner shell into a pair of axially spaced forward and rear annular chambers within said midframe, a second inner shell spaced radially between said intermediate shell and said first inner shell and extending longitudinally between said annular partition plate and said end plate for dividing said axially spaced rear annular chamber into two radially spaced chambers, said intermediate shell having a plurality of openings therein to admit compressed air into the adjacent one of said rear radially spaced chambers, outlet passages in some of said struts from said adjacent radially spaced chamber to deliver compressed air externally of the engine, intake passages in some of said struts to admit outside air into said axially spaced forward chamber, at least one fan inlet conduit within said first inner shell extending from said forward chamber to said cooling fan, and at least one fan discharge conduit from said cooling fan extending longitudinally through said axially spaced forward chamber into the innermost one of said rear radially spaced chambers between said first and second inner shells for conducting cooling air longitudinally through said midframe, seal leakage conduits within said intermediate shell extending between the intermediate shell and the forward end plate, and exhaust passages in some of said struts communicating with said conduit to exhaust seal leakage air outside of the engine, and a partition plate in some of the said struts to divide the interiors thereof into at least two of said passages.

21. In a gas turbine engine having a turbine-driven compressor, a combustion apparatus supplied by the compressor to power the turbine, and a midframe defining an annular outlet passage from said compressor to said combustion apparatus; said midframe including an outer shell defining an outer wall of said passage, an inner shell spaced from said outer shell and defining an inner wall of said passage, a plurality of radially disposed hollow support struts extending across the said passage between the said shells and structurally uniting the shells, spaced forward and rear end plates joining the ends of said inner shell, means defining with said inner shell and end plate a first conduit disposed inwardly of said inner shell and extending between the inner shell and said forward end plate, and means defining a second conduit disposed inwardly of said inner shell and extending longitudinally thereof between said forward and rear end plates, said forward end plate having an opening therein communicating with said first conduit and another opening therein communicating with said second conduit, said inner shell having an opening therein communicating with said first conduit and the interior of one of said support struts, said outer shell having an opening therein communicating with the interior of the said one of said support struts, and said rear end plate having an opening therein communicating with said second conduit.

References Cited in the file of this patent

UNITED STATES PATENTS

| | | |
|---|---|---|
| 1,826,666 | Lawrence | Oct. 6, 1931 |
| 1,930,782 | Turner | Oct. 17, 1933 |
| 2,475,635 | Parsons | July 12, 1949 |
| 2,548,886 | Howard | Apr. 17, 1951 |
| 2,625,794 | Williams | Jan. 20, 1953 |
| 2,647,684 | Lombard | Aug. 4, 1953 |
| 2,674,090 | Highberg | Apr. 6, 1954 |
| 2,682,363 | Lombard et al. | June 29, 1954 |

FOREIGN PATENTS

| | | |
|---|---|---|
| 264,721 | Switzerland | Feb. 1, 1950 |